T. W. BYRNE.
PRIMARY BATTERY.
APPLICATION FILED DEC. 24, 1908.
946,009.
Patented Jan. 11, 1910.
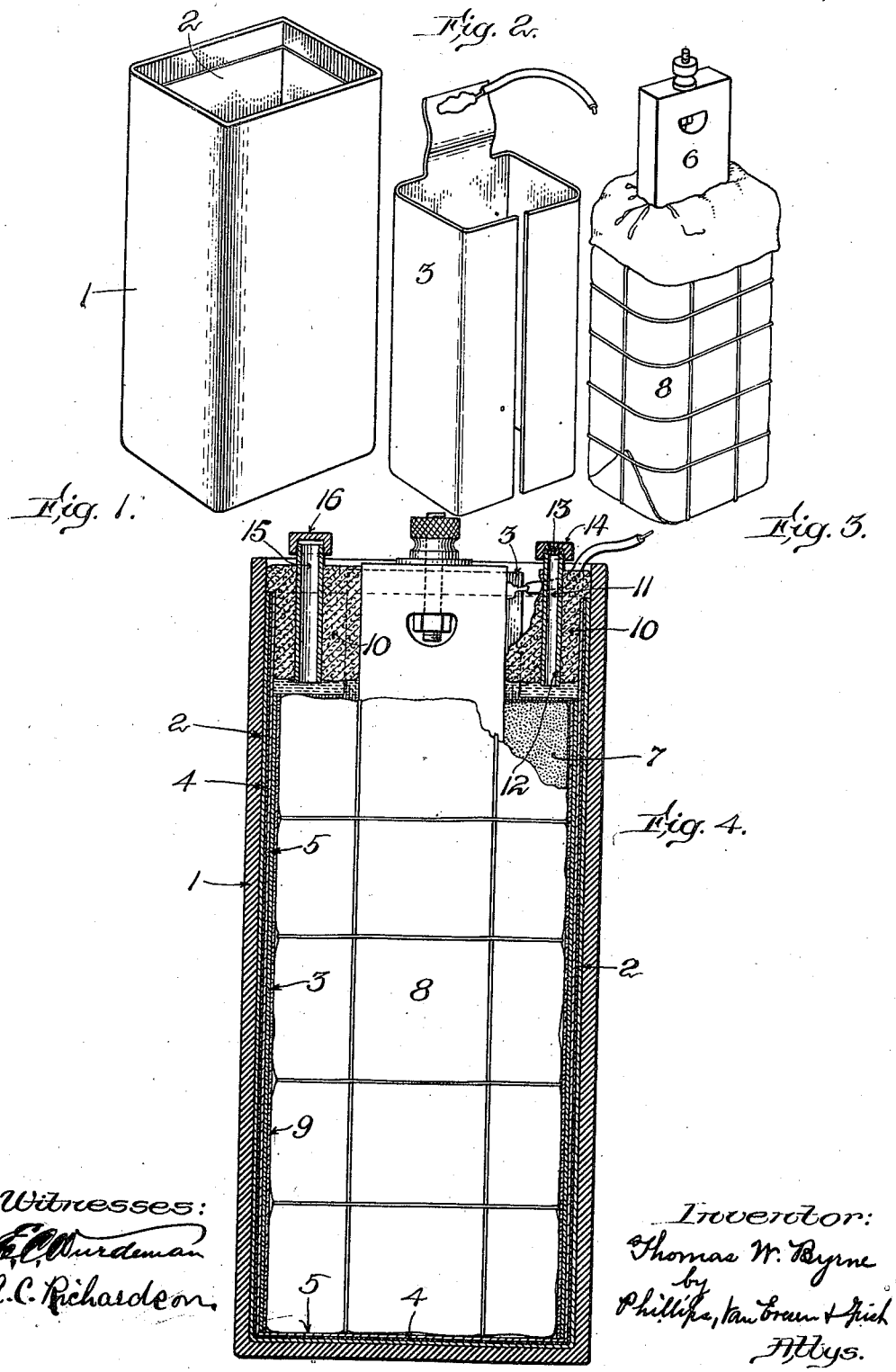

UNITED STATES PATENT OFFICE.

THOMAS W. BYRNE, OF BOSTON, MASSACHUSETTS.

PRIMARY BATTERY.

946,009.

Specification of Letters Patent.

Patented Jan. 11, 1910.

Application filed December 24, 1908. Serial No. 469,118.

*To all whom it may concern:*

Be it known that I, THOMAS W. BYRNE, a citizen of the United States, residing at Boston, in the county of Suffolk and State of Massachusetts, have invented certain new and useful Improvements in Primary Batteries; and I do hereby declare the following to be a full, clear, and exact description of the invention, such as will enable others skilled in the art to which it appertains to make and use the same.

The present invention relates to primary batteries, and more particularly to batteries in which carbon and zinc form the elements, and a solution of ammonium chlorid or of some similar salt is used as the exciting fluid.

The object of the present invention is to produce a battery of the above type which shall be efficient in operation, which shall suffer little, if any, deterioration while standing idle, which may be constructed at small expense, and which may be subjected to rough handling with little liability of damage.

To the above ends the present invention consists in the battery hereinafter described and more particularly defined in the claims.

In the accompanying sheet of drawings the present invention is illustrated as embodied in a wet battery, Figure 1 showing in perspective the container or receptacle; Fig. 2 is a perspective view of the zinc element, and Fig. 3 a perspective of the carbon element surrounded by the depolarizing material; Fig. 4 shows the cell complete in vertical section.

The container for the battery comprises a rectangular box or casing 1 which is preferably made from pasteboard, fiber, or similar material, and in order to render the container waterproof an inner lining 2 of zinc is provided. This zinc lining is preferably made of thin sheet zinc in box form with soldered joints and of such size that it will just slip into the inside of the casing 1. The container thus formed is absolutely waterproof, owing to the water-tight zinc lining, and at the same time may be subjected to rough handling without serious damage, the outer casing stiffening and protecting the zinc lining from injury or wear, and both casing and lining yielding or bending under extreme pressure without danger of fracture or other damage. In order to prevent the zinc lining of the container from being consumed during the operation of the battery, it is necessary to insulate it from the zinc element 3 which fits closely within the lining, and this may be accomplished by a coating 4 of asphaltum paint or some similar substance which is applied to the inside of the lining. The zinc element 3 which is in sheet form and well amalgamated is next inserted in the container, and is preferably further insulated from the inner zinc lining 2 by a waxed paper 5 at the bottom as well as at the sides. The carbon element consists of a piece of stick carbon 6, surrounded, except at its upper end, by the usual depolarizing material 7, which may consist of manganese dioxid and powdered graphite intimately mixed and held around the carbon 6 by means of a bag 8. Blotting paper 9 or similar absorptive material is preferably wrapped around the carbon element which is then inserted in the zinc element, after which the active solution is poured into the cell. A saturated solution of sal-ammoniac or ammonium chlorid may be used for this purpose. The top of the cell is sealed with some suitable material 10 such as pitch or asphaltum to prevent loss of active solution by spilling or evaporation. Preferably a vent 11 is provided by means of the pipe 12 which passes through the seal, and through which any gas which may be formed will escape. The upper end of this pipe 12 is threaded and its open end covered by a leather washer 13 held in place by a screw-threaded cap 14 having a central aperture. The leather washer is sufficiently porous to permit the escape of gas if any substantial amount should collect beneath the seal, thus preventing injurious internal pressure within the cell. At the same time the washer is sufficiently impervious to prevent the solution from flowing out freely if the cell should be accidentally tipped over. The cell is also preferably provided with a filling tube 15 closed by the tightly fitting cap 16, which may be removed to enable a user to renew or replenish the active solution, if necessary.

The above described construction possesses many advantages over the batteries of this type now known in the art. Owing to the large amount of zinc provided and the possibility of replenishing the active solution, the battery may be used for a long time, particularly for open circuit work, the amalgamating of the zinc preventing any substantial deterioration due to local action while the battery is standing idle. Not only is the present battery as clean as the ordinary dry battery but as evaporation and accidental spilling are prevented it will require no more care. All danger of the fracture or leaking of the container from rough handling is practically prevented. Since the inner lining of the container is of zinc, which is the same metal as the element in close proximity to it, no electrolytic action will be set up between the lining and the zinc element if by any chance the two should be brought into mechanical contact. Moreover, this zinc lining is unaffected by the active solution except where impurities in various portions of the lining cause a local action. By coating the lining with asphaltum paint, which is the preferred construction of the present invention, the possibility of such local action is reduced to a minimum and can occur only because the paint coating is not entirely waterproof or is injured in some way during manufacture or use.

While the battery shown in the drawings, and above described, is a wet battery, it is obvious that the electrolyte or active solution could be made in the form of a paste or semiliquid, thus making the battery a so-called dry battery.

Having thus described the present invention, what is claimed is:—

1. A primary battery comprising a container, consisting of a pasteboard case provided with an impervious zinc lining, a coating of insulating paint on the inside of the zinc lining, a zinc element within the container, insulating sheet material between the zinc element and the zinc lining, a carbon element surrounded with depolarizing material and within the zinc element, absorptive material between the zinc element and the depolarizing material, an active solution, and a seal closing the top of the container, substantially as described.

2. A primary battery comprising a container consisting of a casing provided with an impervious zinc lining, a zinc element, within the container, insulating material to permanently insulate the zinc element from the zinc lining, a carbon element within the container, an electrolyte and a seal closing the top of the container, substantially as described.

3. A primary battery comprising a container consisting of a zinc lined casing, a continuous insulating coating for the zinc lining, a zinc element within the container and out of electrical connection with the lining, a carbon element within the zinc element, depolarizing material between the carbon element and the zinc element and an electrolyte, substantially as described.

4. A primary battery comprising a container consisting of a casing provided with an impervious zinc lining, a coating of insulating paint on the inside of the zinc lining, and a zinc element, a carbon element, depolarizing material, and an electrolyte, all within the container, substantially as described.

In testimony whereof I affix my signature, in presence of two witnesses.

THOMAS W. BYRNE.

Witnesses:
 ALFRED H. HILDRETH,
 ANNIE C. RICHARDSON.